UNITED STATES PATENT OFFICE.

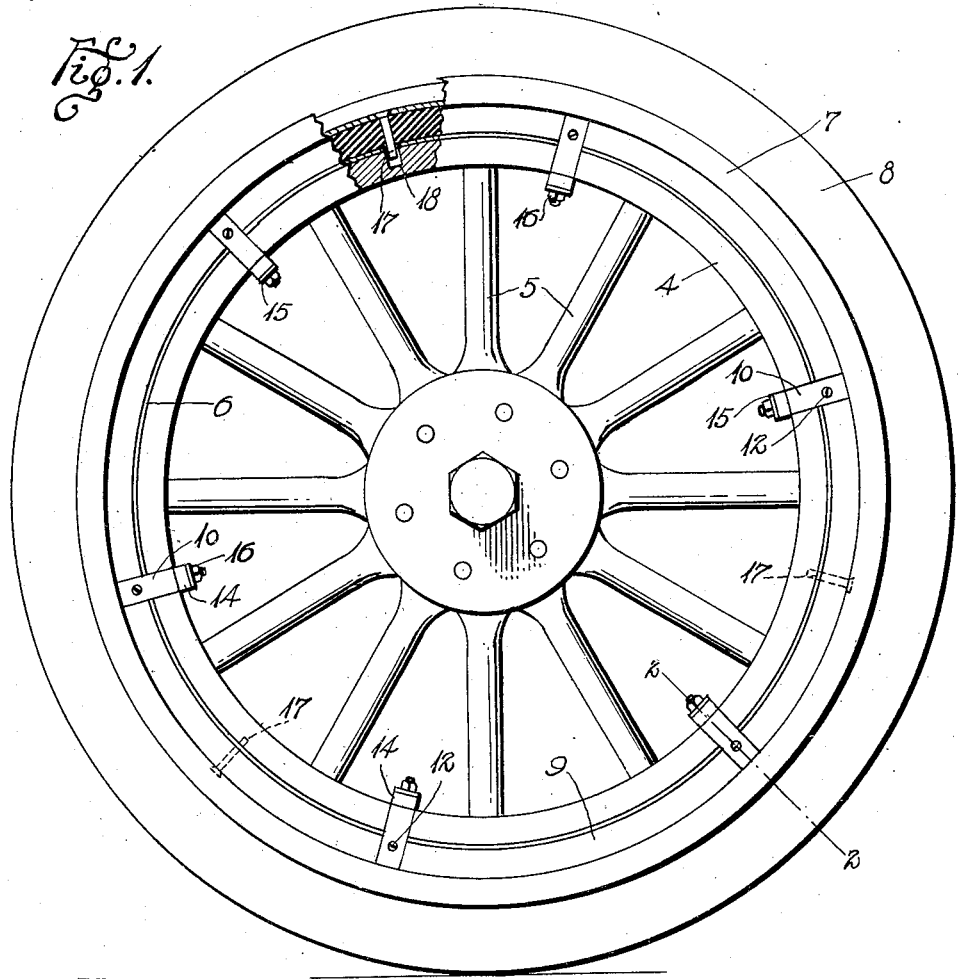
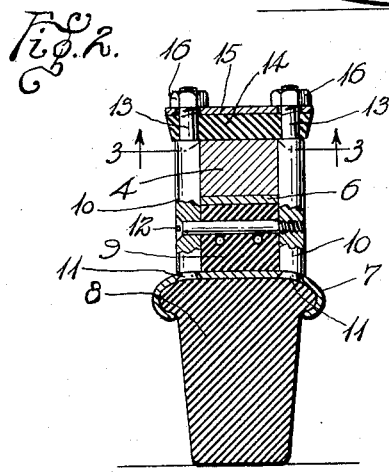
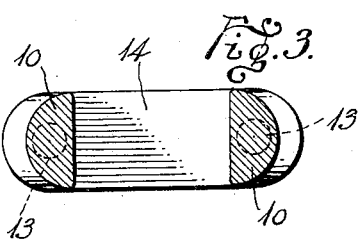

ALBERT L. BENNETT, OF WAUSAU, WISCONSIN.

CUSHIONED WHEEL.

1,261,896.  Specification of Letters Patent.  Patented Apr. 9, 1918.

Application filed December 13, 1917. Serial No. 207,648.

*To all whom it may concern:*

Be it known that I, ALBERT L. BENNETT, a citizen of the United States, residing at Wausau, in the county of Marathon and State of Wisconsin, have invented new and useful Improvements in Cushioned Wheels, of which the following is a specification.

This invention appertains to vehicle wheels and particularly to that class having for their primary object the elimination of pneumatic tires.

It is the object of the invention to provide a vehicle wheel having a cushion between the rim and felly, and novel means for guiding the rim and felly for relative movements in the plane of the wheel only, to prevent transverse displacement due to skidding or lateral strains.

Another object is the provision of novel yet simple inexpensive means for guiding the rim and felly for relative movement in the plane of the wheel, which means will be thoroughly practical and efficacious in use, there being no liability for the improved construction to become clogged with mud or other foreign matter.

A still further object of the invention is to provide in addition to the cushion between the rim and felly, supplementary cushions at the inner side of the felly to assist in the cushioning and absorption of shocks.

With the foregoing and other objects in view, which will be apparent as the construction is better understood, the invention resides in the novel arrangement and construction of parts hereinafter described, it being understood that changes within the scope of the appended claims, can be made without departing from the spirit of the invention.

The invention is illustrated in the accompanying drawings, wherein—

Figure 1 is a side elevation of the improved wheel, portions being broken away.

Fig. 2 is an enlarged section on the line 2—2 of Fig. 1.

Fig. 3 is an enlarged section on the line 3—3 of Fig. 2.

The body of the wheel embodies, as usual, a felly 4, spokes 5 and a metallic band 6 fitted on the felly surrounding and spaced from the felly and band, is a rim for the tire 8, said rim being channeled and of the clencher type, as illustrated, for removably holding the tire, which is preferably of solid rubber, or other equivalent resilient material. Sandwiched between the rim 7 and band 6 is an annular cushion 9 of soft pliant rubber or its equivalent, which in the absence of strains holds the rim and felly concentric, and which cushions the felly or inner rim from shocks, as will be apparent.

The means for constraining the felly and rim for movements relatively in the plane of the wheel only, embodies a suitable number of pairs of radial guide bars 10, preferably although not necessarily, of semi-circular cross section, and disposed at suitable points about the wheel at opposite sides of the felly and cushion. The outer ends of said guide bars are rigidly secured to the rim 7, such as by riveting as at 11, the outer ends of said guide bars being reduced and swaged in counter-sunk apertures in the rim flush therewith to prevent chafing the tire. The guide bars are suitably spaced to fit snugly against the opposite sides of the felly and cushion, with the broad flat side fitting against said felly and cushion, and a screw 12 connects each pair of guide bars and extends through the cushion a suitable distance from the band 6. The screw has a head seating against one guide bar and its threaded end is screw-threaded into the other guide bar, so that by tightening the screw, the guide bars can be drawn snugly up against the sides of the felly, to prevent any side play between the rim and felly, but to permit them to move freely away from one another in all radial directions.

The inner ends of the guide bars 10 have reduced stems 13, and cross plates 15 connect the stems of the several pairs of guide bars and have apertures through which the stems project for the movement of said guide bars on the stems. Supplementary cushions 14 are fitted on said stems and confined between the cross members or plates 15 and the felly 4 to be compressed at the points where the felly and rim separate, thus providing additional cushioning means. Nuts 16 are threaded on the stems 13, to provide means for retaining the cross members or plates 15 thereon. It will be noted that said members or plates 15 provide yokes for coupling the inner ends of the guide bars together.

In order to prevent circumferential creeping or displacement of the rim and felly, a suitable number of inwardly-projecting fingers or pins 17 are secured to the rim and project through the cushion 9 into recesses 18 in the felly 4 and band 6.

In use, it is apparent that when the tire is riding on the road, the rim 7 is resiliently supported thereby, while the felly is similarly supported by the cushion 9. Moreover, when the felly and rim move toward one another at one point of their circumference, they move apart at the diametrically opposite point thereby compressing those supplementary cushions adjacent to the first named point. This provides for an effective resiliency, without a tendency to distort either the rim or felly. As above explained, the guide bars prevent side play, and with the plates 15, provide yokes carried by the rim and surrounding the felly and slidably engaging it to guide said parts for movement in the plane of the wheel only. The cushions 14 extend transversely across the inner periphery of the felly and their apertured ends engage the stems 13 adjacent to the shoulders of the guide bars 10. The construction is extremely simple and can be cheaply manufactured, but is nevertheless practical and efficient.

Having thus described the invention, what is claimed as new is:

1. A vehicle wheel having a rim and felly, cushioning means between them, inwardly projecting guide-bars secured to the rim and disposed at opposite sides of the felly, inner cushioning means extending transversely across the inner periphery of the felly, and having apertured portions engaging said bars, and means secured to the bars and bearing against the inner side of the inner cushioning means.

2. A vehicle wheel having a rim and felly, cushioning means between them, inwardly projecting pairs of guide bars secured to the rim and disposed at opposite sides of the felly, transverse members connecting said bars in pairs at the inner periphery of the felly, inner cushions between said felly and members, said members and inner cushions each having apertured portions engaging said bars, and means for holding said members on the bars.

3. A vehicle wheel having a rim and felly, cushioning means between them, inwardly projecting pairs of guide bars secured to the rim and having broad flat sides bearing slidably against the opposite sides of the felly, said bars having reduced stems at their inner ends, cross members fitted on said stems, transverse inner cushions between said cross members and felly having apertured portions on said stems, and means on the stems for holding the cross members thereon.

ALBERT L. BENNETT.

Copies of this patent may be obtained for five cents each, by addressing the "Commissioner of Patents, Washington, D. C."